United States Patent
Corbella Cordomi

(10) Patent No.: US 6,840,406 B2
(45) Date of Patent: Jan. 11, 2005

(54) PROPORTIONAL VOLUMETRIC INJECTOR-DISPENSER

(75) Inventor: Xavier Corbella Cordomi, Barcelona (ES)

(73) Assignee: Innovacio Technologica Catalana, Santa Perpetua de Mogoda (ES)

(*) Notice: Subject to any disclaimer, the term of this patent is extended or adjusted under 35 U.S.C. 154(b) by 0 days.

(21) Appl. No.: 10/333,397

(22) PCT Filed: Jul. 13, 2001

(86) PCT No.: PCT/IB01/01248

§ 371 (c)(1),
(2), (4) Date: Jun. 5, 2003

(87) PCT Pub. No.: WO02/05940

PCT Pub. Date: Jan. 24, 2002

(65) Prior Publication Data

US 2004/0035886 A1 Feb. 26, 2004

(30) Foreign Application Priority Data

Jul. 17, 2000 (ES) ...................................... 200001916 U

(51) Int. Cl.[7] ................................................ B67D 5/60
(52) U.S. Cl. ..................... 222/145.5; 222/388; 222/630
(58) Field of Search ................................. 222/388, 386, 222/321.9, 383.1, 400.8, 630–631, 636, 385, 145.5, 145.6, 628; 417/503, 401, 398–399, 132, 135, 129, 136, 138, 149

(56) References Cited

U.S. PATENT DOCUMENTS 3,556,682 A * 1/1971 Sakamoto et al. .......... 417/102
4,828,461 A * 5/1989 Laempe ...................... 417/132

FOREIGN PATENT DOCUMENTS

| DE | 873305 | * 4/1953 | |
| DE | 1566286 | * 2/1971 | |
| DE | 2016999 | * 10/1971 | ............ B67D/1/12 |

* cited by examiner

Primary Examiner—Frederick C. Nicolas
(74) Attorney, Agent, or Firm—Steinberg & Raskin, P.C.

(57) ABSTRACT

An injector dispenser comprises a chamber (1) with two main sections (1a, 1b) of different diameter inside wich moves a primary piston (3) with zones (3a, 3b) of different diameter, with the piston body (3) being traversed by a slide (17), provided moreover with a secondary cylinder (12) and magnetic device of positioning and locking of driven flow that act as a stop on the slide (17), that includes inside it a pair of discs (18, 19) situated at the ends. A pump is achieved with a less complex structure and greater precision in the dispensing of the liquids to be supplied and using less energy.

7 Claims, 3 Drawing Sheets

PROPORTIONAL VOLUMETRIC INJECTOR-DISPENSER

FIELD OF THE INVENTION

This invention relates to a proportional volumetric injector-dispenser designed to supply dispensed quantities of a certain liquid, incorporating proportionally a second or further liquids which have to be supplied together with the first-mentioned liquid in a single mixture.

BACKGROUND OF THE INVENTION

Known in the art is the use of injecting-dispensing devices of this type within the fields of foodstuffs, chemicals, agriculture, industry and, in particular, when two or more different liquids have to be supplied in pre-established proportions and preferably mixed before they are used.

The devices of this type currently have the disadvantage of having to have complex design and structural characteristics. These characteristics mean a larger number of parts subject to wear by friction, with the consequent breakdowns and repairs, at the same time implying high pressure drops in the mixture supplied. Such pressure drops reduce the performance of the injector. All these factors give rise to high cost in the manufacturing, maintenance and functioning of these devices.

For the purposes of this invention, and as an example of a specific application, reference will be made in what follows to a dispensed irrigation water injector device for agriculture. Said improved proportional volumetric injector-dispenser essentially comprises a chamber or cylinder with two main sections of different diameter, inside which moves a primary piston with various zones of different diameter, fitting with close fit in said cylinder sections and with the corresponding pressure-tight seals, forming between the two zones a large central chamber which leads into the indicated two main sections in the cylinder, which central chamber communicates with a liquid-inlet pipe, while the internal end of the lower-diameter section of the cylinder has another pipe for outlet of the dispensed liquid to the exterior, with the piston body being traversed longitudinally by a slide, and being provided moreover with a secondary cylinder throughout a tubular support and connected to the exterior through a check valve and a connecting teat for a liquid-inlet pipe that permits the sliding of a secondary piston whose stem extends through the interior of the tubular support and is attached by its end to the main piston.

OBJECTS AND SUMMARY OF THE INVENTION

This invention has been created in order to provide a proportional volumetric injector-dispenser that resolves the aforementioned disadvantage, while providing other additional advantages that will become obvious from the description provided below.

The proportional volumetric injector-dispenser of the invention is characterized in that it also includes a magnetic means of positioning and locking of driven flow that act as a stop on the slide situated inside the primary piston and in that the slide includes inside it a pair of discs situated at the upper and lower ends of said slide, which discs are provided with a plurality of orifices and are separated by elastic means.

Thanks to these characteristics the implementation is achieved of a pump with a less complex structure and greater precision in the dispensing of the liquids to be supplied. Moreover, the presence of multiple, large holes design of the slide, permits a greater passage of fluid with lower friction, using less energy and also preventing the slide being blocked by impurities that may be present in the fluid. Use of the magnetic positioning and locking means simplifies construction of the mechanism and prevents wear of the mechanism, unlike with the use of existing mechanical locking means, at the same time as achieving greater precision in positioning of the slide.

In accordance with another aspect of the invention, the driven-flow magnetic positioning means include at least two magnets sheathed in stainless ferritic steel, so that the magnetic flow is driven so that it comes into contact with the ends of the slide.

Thanks to the presence of these magnets the securing force delivered is intense, and with only a low mechanical separation the power of attraction reduces considerably, so that position of the slide changes thanks to the presence of a light-weight spring.

According to another aspect of the invention, the interior wall of the piston includes floating, low-friction O-rings. It thus closes off losses of fluid in the slide with the minimum possible abrasion and wear.

Preferably, the pump includes means for automatic stopping and starting of the pump situated on an exterior end of the cylindrical body attached to the slide, permitting in the stop position the free passage of fluid through the interior of the injector without the need for the fluid to pass through the interior of the slide. In this way, said mechanism permits the piston to be positioned in the upper part of the cylinder when the pump is out of service, thus leaving free passage for the fluid through the interior of the injector device with minimum pressure drops.

Preferably, the slide is of the cylindrical tubular type. Thanks to this design of the slide an extensive passage of fluid is facilitated inside it with minimum pressure drops. Moreover, the fact that it has a cylindrical tubular shape makes cut-off of the passage of liquid inside the device take place by shearing and without the need to implement an over-stress or over-pressure to close the liquid inlet pipe, unlike what occurs with the present devices whose fluid cut-off is carried out by plugging.

Advantageously, the slide implements the opening and closing of fluid passage by carrying out cut-out of fluid passage by shearing at a plurality of radial orifices distributed uniformly.

According to another aspect of the invention, the injector assembly includes at least two secondary pistons and at least two secondary cylinders along a pair of tubular supports, which provide adjustable dosages independently.

BRIEF DESCRIPTION OF THE DRAWINGS

Other characteristics and advantages of the proportional volumetric injector-dispenser of this invention will become evident from the description of a preferred, but not exclusive, embodiment which is illustrated by way of non-restrictive example in the drawings attached. In the drawing.

DETAILED DESCRIPTION OF THE INVENTION

Figure 1:
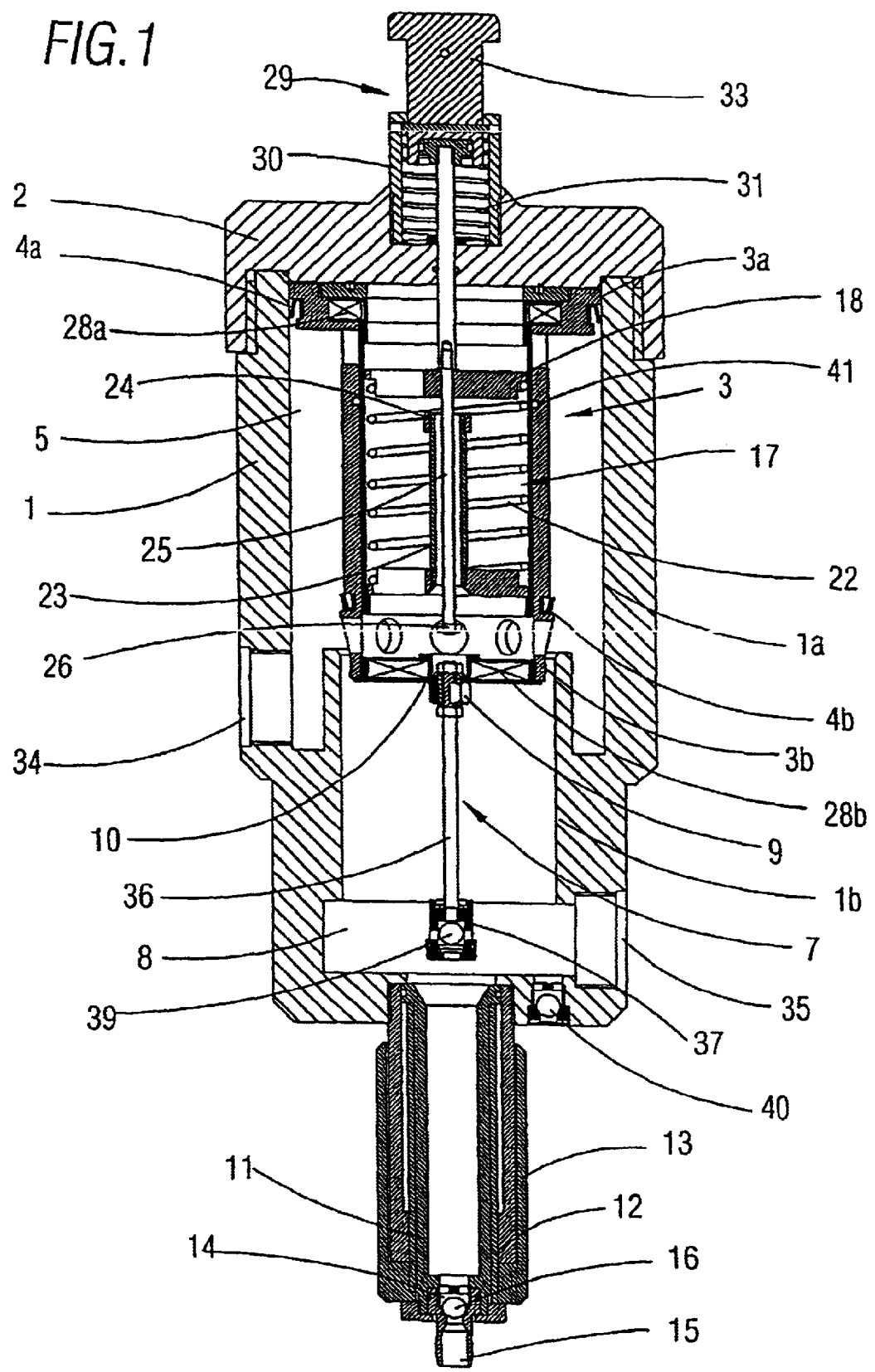
FIG. 1 is an axial-section elevation view of a proportional volumetric injector-dispenser in a stop position.
Figure 2:
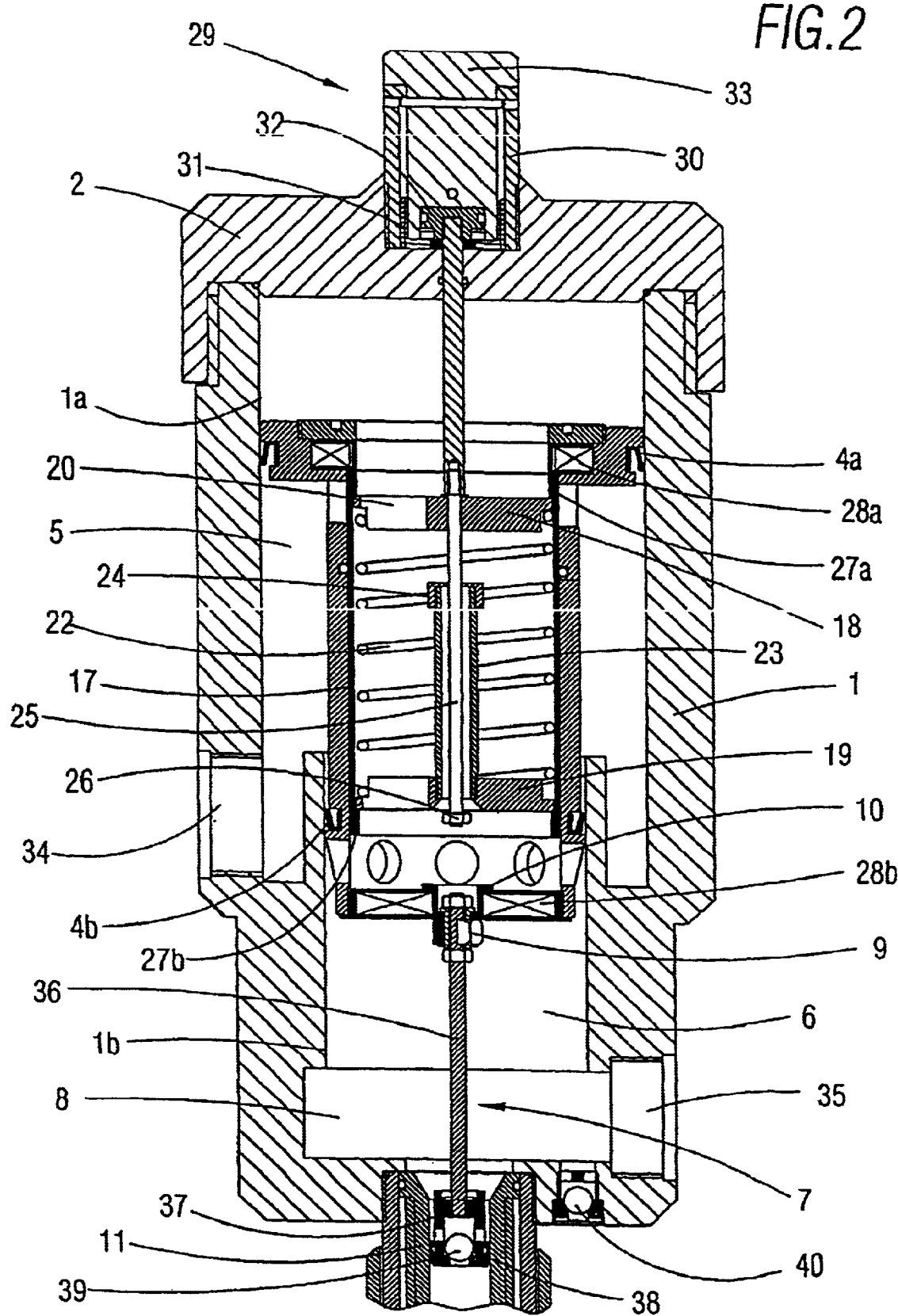
FIG. 2 is an axial-section elevation view of a proportional volumetric injector-dispenser shown in an operating position in which the primary piston is moving towards the upper end of the figure.
Figure 3:
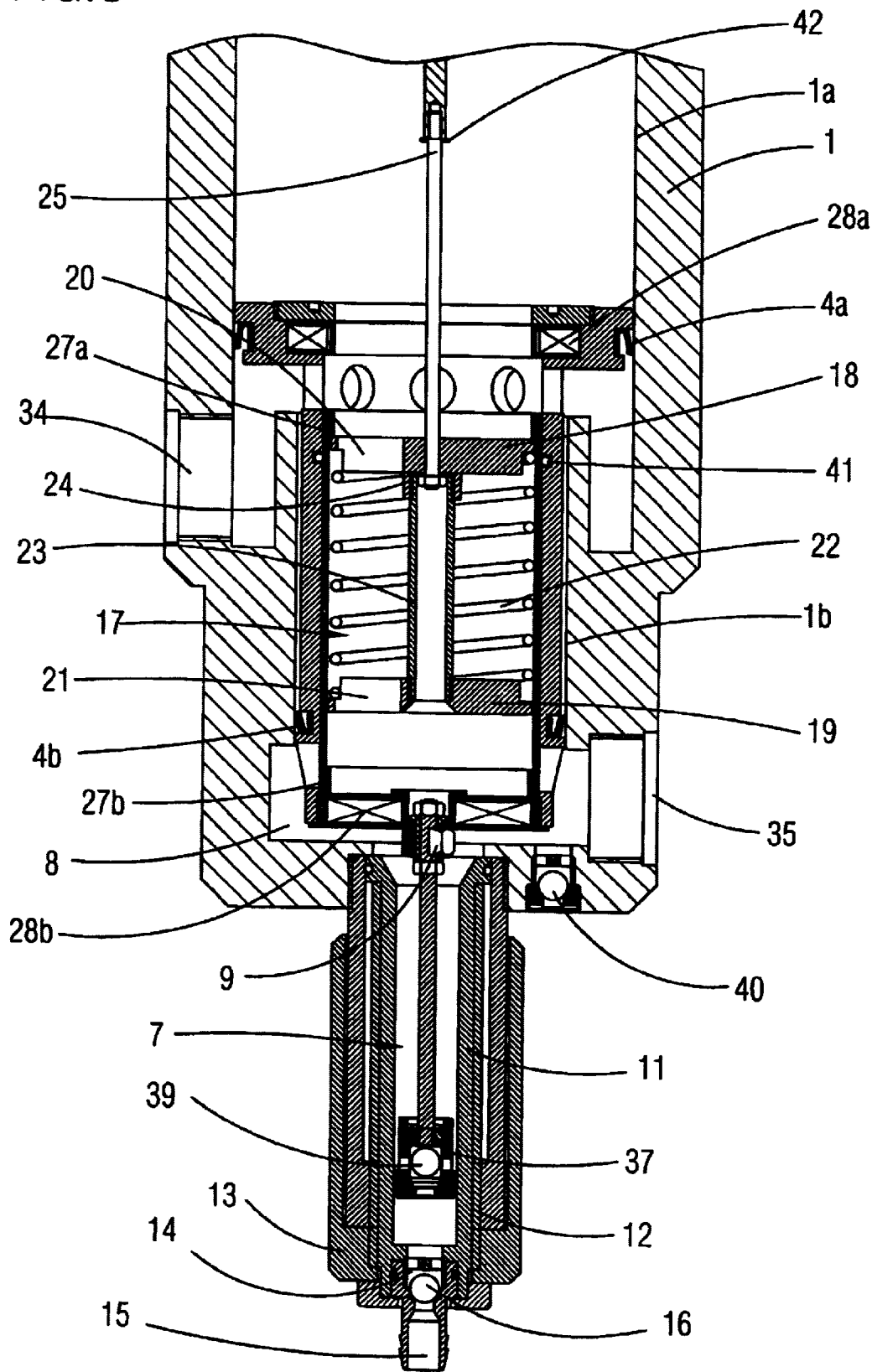
FIG. 3 is an axial-section elevation view of a proportional volumetric injector-dispenser in another operating position in which the slide has moved downwards and the piston is moving towards the lower end of the figure.

The injector devices shown the FIGS. 1, 2, and 3 includes a solid cylindrical body 1 traversed by a coaxial cavity formed by two cylindrical sections 1a and 1b of similar length, and having their diameters decreasing from the end of the upper part of the body 1, whose top part is provided with a threaded cover 2.

Inside the coaxial cavity there a piston assembly 3 that can move freely axially and has two sections 3a and 3b that fit closely with the cylindrical sections 1a and 1b, respectively. The sections 3a and 3b have only just the necessary axial length to contain a pair of lipped seals 4a and 4b which fit closely with the respective sections 1a and 1b of the cylinder 1, thus defining a driving chamber 5 between the piston assembly 3 and the upper cover 2, and a discharge zone 6 between the two sections of the piston. The piston section constitutes, with a second piston assembly 7, an annular plunger which delimits with the bottom of the cylindrical body 1 an annular withdrawal zone or chamber 8.

The above-mentioned piston 7 is attached at the top to the piston 3 by means of a screw-thread 9 situated in a bushing 10 located in a housing situated in the lower part of the piston assembly 3. The piston 7 slides through the interior of a cylinder 11 provided with a long exterior screw-thread 12.

The free end of the cylinder 11 has a cap-wheel threaded onto it 13 for manual operation, and is traversed at its lower part by a hole 14 into which is fixed a teat 15 which receives a liquid-supply tube (not shown) which in its turn acts by keeping in position a large-liquid-flow, one-way check valve 16 provided to permit the passage of a flow towards the interior of the device of this invention.

As can be seen in FIG. 2, the secondary piston 7 and the tubular support 11 are of similar axial lengths equivalent to the stroke of the piston inside the cylinder 11.

Within the piston body 3 is situated with sliding fit a slide of the cylindrical tubular type 17 with ends of ferritic steel. Said slide 17 controls the changes of opening and closing of the flows, implementing a shearing cut-off of fluid passage through the uniformly distributed radial orifices. In its interior are situated on its two upper and lower ends some discs 18 and 19 with cylindrical walls provided with large orifices 20, 21 to facilitate the passage of liquid. Between the discs 18 and 19 is positioned a helical spring 22 which actuates when said discs 18 and 19 move axially through the interior of the slide 17. From the disc 19 situated in the lower zone there projects in an ascending direction a cylindrical body 23 which includes a threaded cover 24 on its top part which is traversed by a stem 25 which has a threaded section 26 on its lower end. The piston assembly 3 has on its ends a pair of stainless ferritic steel magnets for locking with some ferritic steel stops 27a and 27b. Situated on each end of the slide 17, said magnetic stops with magnets 28a and 28b are sheathed in stainless steel and act in the travel of the slide 17, permitting it to change position during operation of the device.

The stem 25 is associated with a device 29 for driving the piston assembly 3 manually or automatically. In this case, the device is driven manually. This device 29 includes a tubular body 30 which is locked to the interior with the cover 2, and has in its interior a helical spring 31 and a body 32 which is attached to the stem 25. In order to drive the device 29, a body 33 situated on the upper part simply has to be pushed.

The withdrawal chamber or zone 6 is attached to a connector 34 connected to pipes (not shown) which supplies a liquid, such as water under pressure. Similarly, the outlet of discharge chamber 8 includes a connector 35 also situated on the side wall of the cylinder 1, which is used for evacuation of the dispensed liquid to be supplied.

As can be appreciated in greater detail in FIGS. 2 and 3, the secondary piston assembly 7 is made up of a stem 36 which extends towards the lower part and has on its lower end a cylindrical body 37. On the lower part of said body 37 is a lipped seal 38. When the device is operating the body 37, which has inside it a one-way valve 39, that slides through the tubular body 11 which remains hermetically closed thanks to the presence of the lipped seal 38.

A one-way valve 40 included in the lower part of the cylindrical body 1 is used for the inlet of air in certain operating situations of the injector of this invention.

On the internal wall of the slide 17 there is a low-friction floating O-ring which shuts off fluid losses without abrasion or appreciable wear.

The functioning of the injector device is described below and with the help of FIGS. 2 and 3.

In the position shown in FIG. 2, if the device is fed with a suitable supply of fluid under pressure at the connector 34, the piston assembly 3 is moving upwards with respect to FIG. 2. Indeed, the fluid which enters through the connector 34 passes through a zone 5 where its pressure P, acting on the face of the piston 3, applies against the latter a flyback force $F_1$, in which the diameter corresponds to the interior diameter of the cylinder 1b. At the same time, the fluid applies against the face of the piston an advance force $F_2$, in which the diameter corresponds to the interior diameter of the cylinder 1a. From the comparison of both expressions and from the composition of the two forces $F_1$ and $F_2$ which act against the end faces of the piston, it can be deduced that the latter is submitted to a resulting force $F=F_2-F_1$ which acts in a down-up direction in relation to FIG. 2, so that the piston assembly 3 moves towards the upper part of the cylinder 1.

A moment before the piston 3 reaches its end of stroke at the upper part, the upper disc 18 of the slide 17 strikes against a washer 42 of the upper part of the stem 25 and, if the reaction of the spring 22 is sufficient, the continued advance of the piston assembly means that the slide assembly 17 is displaced downwards with respect to the piston assembly 3, the upper end of the slide is unlocked from the upper magnetic stop, moving the slide 17, and at the end of the movement leaves the lower end fixed in the lower magnetic stop, thereby fixing the slide assembly 17 in a new operating position.

The fluid which reaches the working zone thus communicates with the chamber 5 and the interior of the slide. Also, the pressure of the working zone is cancelled out, as this zone is now in direct communication with the connector 35.

A moment before the piston 3 reaches the end of this downward stroke, the lower part of the stem 25 is detained by the upper end of said stem, so that the stop causes unlocking of the slide and the pretensioned spring 22 sets off the sliding of the slide 17 towards the upper part in relation to the piston assembly 3, in an inverse movement to that described above, returning to the initial position, from which moment an operating cycle is repeated as described.

At the same time as the to and fro travel of the piston 3 takes place within the cylinder 1, the chamber or working zone of the secondary cylinder 11 undergoes corresponding increases and reductions of volume which, with provision of the check valve 16, cause functioning by way of suction-impeller pump which sucks the liquid which arrives through the pipes attached to the teat 15 and drives it towards the planned point of use, mixed in with the driving liquid which reaches the working zone 6.

The liquid which is sucked in with each cycle of the piston 7 is mixed with the water or other liquid coming from the connector 34 in the chamber situated in the lower part of the cylinder 1. Furthermore, the quantity of auxiliary liquid which is sucked in through the valve 16 depends on the length of the suction stroke inside the secondary cylinder 12. The liquid obtained from mixing of the two liquids is expelled through the connector 35.

It should be stressed that when the device is in the passage position, as shown in FIG. 1, the main fluid which enters through the connector 34 circulates freely without passing through the interior of the slide 17. As the liquid does not pass through the slide 17, pressure drops are minimum.

The injector device described in this preferred embodiment permits supply of two or more liquids mixed together, for example irrigation water and a solution of agricultural coadjutant fluid to be added to it, in proportions that are strictly precise and independent of the work rate to which the device is set.

The details, forms, dimensions and other accessory elements, together with the materials used in manufacturing of the proportional volumetric injector-dispenser of the invention may be suitably replaced by others that are technically equivalent and do not depart from the essential nature of the invention or the sphere defined by the claims included below.

What is claimed is:

1. Proportional volumetric injector-dispenser, comprising:

a chamber or cylinder (1) with two main sections (1a,1b) of different diameter, inside which moves a primary piston (3) with various zones (3a,3b) of different diameter, forming between the various zones (3a,3b) a large central chamber (5) which leads into the indicated two main sections in the cylinder (1), the central chamber (5) communicates with a liquid-inlet pipe, while an internal end of a lower-diameter section of the cylinder has another pipe for outlet of a dispensed liquid, with the primary piston (3) being traversed longitudinally by a slide (17), and being provided moreover with a secondary cylinder (12) throughout a tubular support and connected to the exterior of the cylinder through a check valve (16) and a connecting teat (15) for the liquid-inlet pipe that permits sliding of a secondary piston (7) whose stem (36) extends through the interior of the tubular support and is attached by the end of the secondary piston, and wherein said injector-dispenser also includes means of positioning and locking of driven flow that act as a stop on the slide (17) situated inside the primary piston (3) and in that the slide (17) includes inside a pair of discs (18,19) situated at an upper and lower ends of said slide (17), the discs (18,19) are provided with a plurality of orifices (20,21) and are separated by elastic means.

2. Injector-dispenser, as claimed in claim 1, wherein the means of positing and locking of driven flow include at least two magnets sheathed (28a,28b) in stainless ferritic steel, so that the magnetic flow is driven so that said magnetic flow comes into contact with the ends of the slide (17).

3. Injector-dispenser, as claimed in claim 1, wherein the interior wall of the piston (3) includes floating, low-friction O-rings (41).

4. Injector-dispenser, as claimed in claim 1, wherein includes means for automatic stopping and starting of the dispensing situated on an exterior end of the cylindrical body (1) attached to the slide (17), permitting in the stop position the free passage of fluid through the interior of the injector without the need for the fluid to pass through the interior of the slide (17).

5. Injector-dispenser, as claimed in claim 1, wherein the slide (17) is of the cylindrical tubular.

6. Injector-dispenser, as claimed in claim 1, wherein the slide (17) implements the opening and closing of fluid passage by cutting out of fluid passage by shearing at a plurality of radial orifices distributed uniformly.

7. An injector-dispenser according to claim 1, wherein the injector dispenser includes at least two secondary pistons (7) and at least two secondary cylinders (11) along a pair of tubular supports, which provide adjustable dosages independently.

* * * * *

UNITED STATES PATENT AND TRADEMARK OFFICE
CERTIFICATE OF CORRECTION

PATENT NO. : 6,840,406 B2
APPLICATION NO. : 10/333,397
DATED : January 11, 2005
INVENTOR(S) : Xavier Corbella Cordomi It is certified that error appears in the above-identified patent and that said Letters Patent is hereby corrected as shown below:

On the title page, item (73) Assignee, should read as follows:

(73) Assignee: Innovacio Tecnologica Catalana, S.L.

Signed and Sealed this

Eighth Day of January, 2008

JON W. DUDAS
*Director of the United States Patent and Trademark Office*